United States Patent [19]

Eichelberger et al.

[11] 4,091,361
[45] May 23, 1978

[54] NOISE-IMMUNE CARRIER CURRENT ACTUATED CONTROL

[75] Inventors: Charles W. Eichelberger, Schenectady; Philip M. Garratt, Amsterdam, both of N.Y.

[73] Assignee: General Electric Company, Schenectady, N.Y.

[21] Appl. No.: 748,932

[22] Filed: Dec. 9, 1976

[51] Int. Cl.² ........................... H04Q 9/00; H04B 1/00
[52] U.S. Cl. ............................ 340/168 R; 340/168 S; 340/170; 328/48; 325/323
[58] Field of Search ........... 340/168 R, 167 R, 164 R, 340/310 R, 170, 168 S; 325/323, 325, 64, 38, 30; 328/37, 41, 48

[56] References Cited

U.S. PATENT DOCUMENTS

| | | | |
|---|---|---|---|
| 3,631,398 | 12/1971 | Houghton | 340/167 R |
| 3,863,215 | 1/1975 | McGrogan, Jr. | 340/146.1 BA |
| 3,943,305 | 3/1976 | Hagedorn | 340/163 |
| 3,973,242 | 8/1976 | Field et al. | 340/168 S |
| 3,980,956 | 9/1976 | Woolling, Jr. | 340/171 A |
| 4,006,462 | 2/1977 | Podowski et al. | 340/168 B |
| 4,014,002 | 3/1977 | Tucker | 340/168 B |
| 4,021,741 | 5/1977 | Collins et al. | 340/168 B |

*Primary Examiner*—Donald J. Yusko
*Attorney, Agent, or Firm*—Marvin Snyder; Joseph T. Cohen; Jerome C. Squillaro

[57] ABSTRACT

A redundant digital address and function code, received through an a.c. power distribution circuit, is decoded in a carrier current receiver to perform a predetermined control function. A high degree of immunity to spurious signals is achieved by delaying performance of the function until the correct address portion of the transmitted word has been received at least two times out of three. This increases the likelihood that only the intended function will be performed at only the intended address.

14 Claims, 5 Drawing Figures

NOISE-IMMUNE CARRIER CURRENT ACTUATED CONTROL

INTRODUCTION

This invention relates to control systems actuated by data communicated along with carrier current, and more particularly to a method and apparatus for achieving a high degree of immunity to spurious signals in such system.

In commercial buildings, lighting, heating, ventilating, air conditioning and other loads can be controlled according to requirements determined by computer so as to optimize energy usage. An overall reduction in energy usage may thereby be achieved. In general, the larger the building, the greater the potential for energy savings. Moreover, computer determination of optimum load controls is important if it is desired to eliminate the need to have these load controls manipulated manually several times each day at a plurality of remote locations. However, transmission of control signals through the building power distribution circuits from a central location to each remote location has heretofore involved considerable circuit complexity without achieving concommitant noise immunity. Hence any interfering transients on the line, such as may occur when a motor is initially switched on or when certain electrical devices known to generate electrical noise are operated, may produce false signals and, depending on the type of system, can result in a spurious function being performed at a desired location, a desired function being performed at an erroneous location, or simply spurious functions being performed at random locations. The amount of such interference may readily rise to a level of intolerability in commercial buildings such as factories, office buildings, etc., encouraging disuse of the system and reversion to manual control. Utilization of such system may thus become self-defeating.

The present invention is concerned with a carrier current control signal receiving system intended for use even in the presence of electrical noise on the line. A digital signal (or word) transmitted over the power distribution circuits within the building is received at a plurality of remote locations within the building. The signal, however, is intended only for a predetermined remote location or locations, according to the address portion of the word. Thus the apparatus at each remote location either accepts or ignores the received signal, depending upon the address of the location, and has capability of utilizing an accepted signal to perform the desired function. If the transmitted signal should be garbled for any reason, it is preferable that no action be taken at any of the remote locations, rather than a wrong action. The present invention achieves this result.

Accordingly, one object of the invention is to provide a method and apparatus for decoding redundant address and function codes and providing control signals in accordance with the function codes.

Another object is to provide remotely-located apparatus for receiving information from a central location with a high degree of immunity to false signals.

Another object is to provide a system for receiving signals transmitted over power circuits and for performing control functions only at times when there is strong likelihood that the signal received is the signal intended to have been received.

Briefly, in accordance with a preferred embodiment of the invention, carrier current actuated control apparatus comprises shift register means for temporary storage of a repeatedly-received digital word containing address and function data, the shift register including an address portion and a functions portion. Intermediate data storage means coupled to the functions portion of the shift register means are provided for transferring the function data to the intermediate data storage means. Switching means coupled to the intermediate data storage means are provided for performing desired operations, and address detection means responsive to the address portion of the shift register means actuate the intermediate data storage means to transfer function signals to the switching means.

In accordance with another preferred embodiment of the invention, a method of rendering controlled apparatus relatively immune to spurious control signals comprises monitoring received digital signals to detect simultaneous presence of a predetermined address in a received digital word along with a flag bit occurring at the leading end of the received digital word. Function data received in the digital word are transferred into storage when the predetermined address and the flag bit occur simultaneously, and the controlled apparatus is operated in accordance with the function data when identical digital words have appeared twice out of three consecutively-received digital words.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
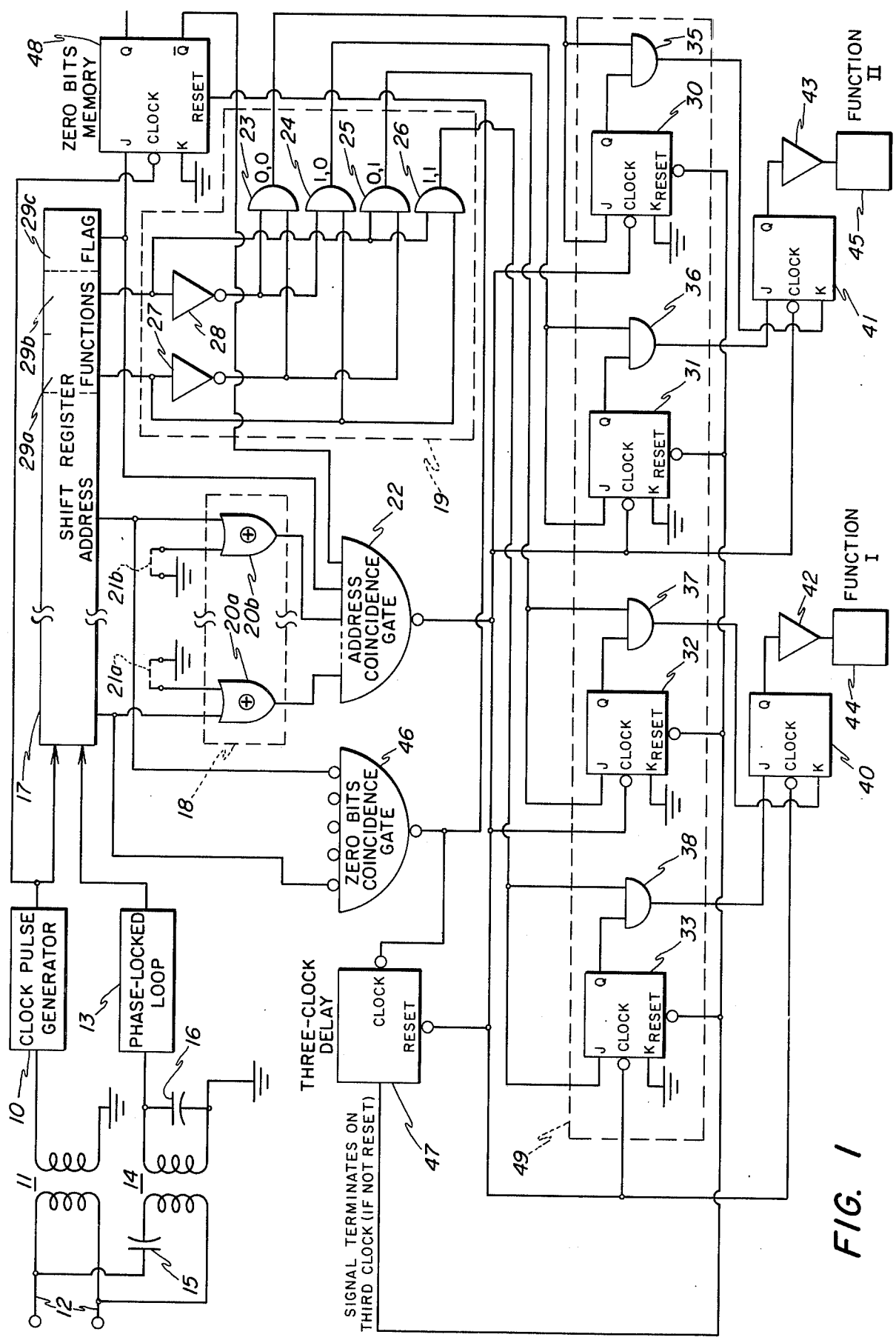
FIG. 1 is a block diagram of the carrier current actuated control apparatus of the instant invention.
Figure 5:
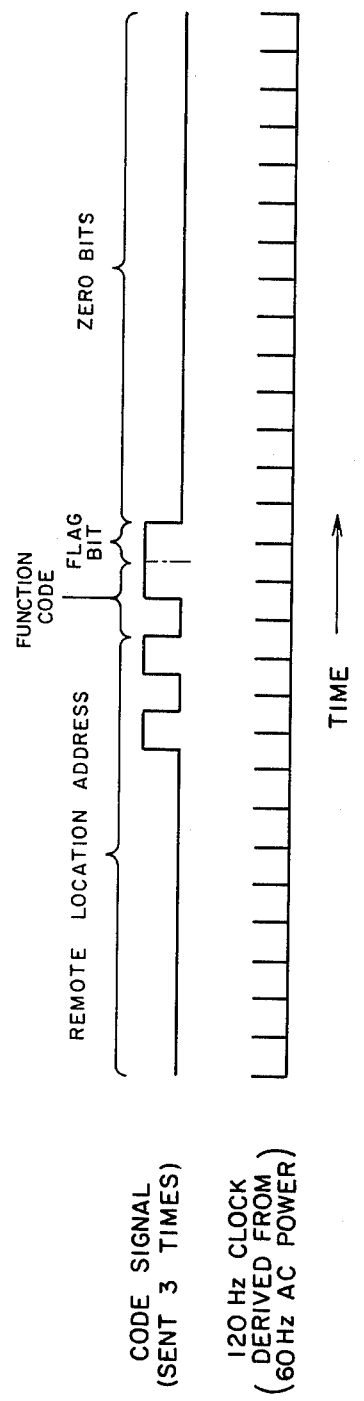
FIG. 5 is a pulse waveform illustration of a typical received digital word on a common time scale with clock pulses in the apparatus of FIG. 1.

In FIG. 1, which illustrates the carrier current actuated control apparatus at a single remote location, a clock pulse generator 10 is shown connected to a power distribution circuit 12 through a transformer 11 within the building in which control function are to be performed at remote locations from a central location. Power distribution circuit 12 is typically of 120 volt, 60 Hz a.c. nominal value. The clock pulse generator produces, in synchronism with the a.c. power voltage, 60 Hz square waves which are differentiated to produce narrow pulses, or spikes, at a 120 Hz rate; i.e., a spike is produced each instant that the a.c. power voltage passes through zero. The resulting 120 Hz clock pulse waveforms are shown in FIG. 5.

A phase-locked loop circuit 13 is connected to power distribution circuit 12 through a double-tuned transformer 14 within the building; that is, a capacitor 15 forms a series resonant circuit with the primary winding of transformer 14 (and also removes most of the 60 Hz current from the transformer), while a small capacitance 16 forms a parallel resonant circuit with the secondary winding of transformer 15 (and also serves to attenuate undesired high frequency transients accompanying the signal). The signal itself, typically of 50 KHz center frequency, is superimposed on the 60 Hz power distribution lines within the building. Transmission of data is accomplished by frequency-shift keying (FSK) modulation such that a 51 KHz signal represents a logic ONE and a 49 KHz signal represents a logic ZERO.

The phase-locked loop circuit produces a digital output signal constituting a logic ONE when a 51 KHz signal is received and a logic zero when a 49 KHz signal is received. Thus when a digital word is received, the sequence of data bits which makes up the word is clocked into shift register 17, one bit at a time, upon occurrence of each 120 Hz clock pulse, in a manner well-known in the art. As evident from FIG. 5, each bit is 1/120 second in duration, and each clock pulse occurs substantially at the midpoint of the period of each data bit. For simplicity, the individual stages of shift register 17 are not shown in FIG. 1, except for the terminal stage 29c, which receives a flag bit, and the function stages 29a and 29b. The remaining portion of the shift register contains the address stages.

Outputs from the address portion of shift register 17, only two of which are shown for simplicity, are connected to a selection circuit 18 which, as shown in FIG. 1, comprises a plurality of two-input EXCLUSIVE OR circuits 20a, 20b. A first input to each of the EXCLUSIVE OR circuits is connected to a separate stage, respectively, in the address portion of shift register 17, and the second input may or may not be grounded through a jumper 21a, 21b. Where the second input is grounded, the EXCLUSIVE OR circuit produces an output ONE only when a ZERO bit is produced by the shift register stage connected thereto; however, where the second input is ungrounded, only a ONE bit in the shift register stage results in a ONE being produced by the shift register stage connected thereto. The jumpers are arranged such that each ONE of the correct address and each ZERO of the correct address, when stored in the address stages of shift register 17, cause each output lead of selection circuit 18 to produce a ONE. In this fashion, temporary storage of the correct address (i.e., for the duration of 1/120 second) in the shift register results in selection circuit 18 supplying a ONE on each of its output leads, which are connected to individual inputs, respectively, of an address coincidence gate, or n-input AND gate 22, n being the number of stages in the address portion of the shift register.

Outputs from each of functions stages 29a and 29b of shift register 17 are supplied to AND gates 23, 24, 25 and 26, both directly and through inverters 27 and 28. Each of inverters 27 and 28 is connected, respectively, to shift register stages 29a and 29b, respectively. Thus AND gate 23 produces an output voltage when the bits in both of the functions stages are ZERO, receiving its input signals from the output of each of inverters 27 and 28. AND gate 24 produces an output voltage when functions stages 29a and 29b are in the ONE and ZERO conditions, respectively, receiving its input signals directly from stage 29a and inverted from stage 29b. AND gate 25 produces an output voltage when the functions stages 29a and 29b are in the ZERO and ONE conditions, respectively, receiving its input signals directly from stage 29b and inverted from stage 29a. AND gate 26 produces an output voltage when both functions stages 29a and 29b are in the ONE condition, receiving its input signals directly from stages 29a and 29b. Those skilled in the art will thus recognize the circuitry of AND gates 23, 24, 25 and 26, together with that of inverters 27 and 28, as comprising a conventional two bit decoder 19. Of course, if any number of functions, m, are to be performed by the system, then decoder 19 would comprise a conventional m bit decoder.

Output signals from each of AND gates 23, 24, 25 and 26 are supplied to the first input of each of two-input AND gates 35, 36, 37 and 38, respectively, and to the J input of each of JK flip-flop circuits 30, 31, 32 and 33, respectively, which collectively comprise intermediate data storage means 49. JK flip-flops for producing complementary output signals are known in the art, and are commercially available under the type designation SN74107 from Texas Instruments, Inc., Dallas, Texas. The clock input of each of flip-flops 30, 31, 32 and 33 is energized by output signals from address coincidence gate 22, while the K input of each of the flip-flops is grounded. The Q output of each of flip-flops 30, 31, 32 and 33 is connected to the second input of each of AND gates 35, 36, 37 and 38, respectively. Output signals from AND gate 38 are furnished to the J input of a JK flip-flop 40, while output signals from AND gate 37 are furnished to the K input of flip-flop 40; therefore, flip-flops 33 and 32 control the condition of flip-flop 40. Similarly, output signals from AND gate 36 are furnished to the J input of a JK flip-flop 41, while output signals from AND gate 35 are furnished to the K input of flip-flop 41; therefore, flip-flops 30 and 31 control the condition of flip-flop 41. The Q output of each of flip-flops 40 and 41 is connected, respectively, to the input of a driver circuit 42 and 43, respectively. Drivers 42 and 43 are connected to energize relays 44 and 45, respectively, so as to perform the desired functions (here designated function I and function II) on whatever fixtures or other apparatus are to be controlled. Those skilled in the art will recognize that if more than two functions bits are to be employed, for each additional bit an additional pair of JK flip-flops and associated AND gates would be required in intermediate data storage means 49, and an additional JK flip-flop and associated driver would be connected to perform the additional function thereby added.

A zero bits coincidence gate 46 has a plurality of inputs, each of which is connected, respectively, to a separate stage, respectively, in the address portion of shift register 17 (although, for simplicity of illustration, connections for only two such stages are shown). Output signals from zero bits coincidence gate 46 are used to advance the count in a three-clock delay circuit 47. This circuit, shown in detail in FIG. 3 and described infra, supplies an output signal to the reset input of each of flip-flops 30, 31, 32 and 33 until it has received three pulses from gate 46 without being reset to zero by an intervening output signal produced by address coincidence gate 22. Upon termination of the output signal from three-clock delay circuit 47, each of flip-flops 30, 31, 32 and 33 switches into a steady reset condition which can only be overcome after restoration of the three-clock delay output signal.

Flag stage 29c of shift register 17 is connected to a separate input of address coincidence gate 22 and to the J input of a zero bits memory JK flip-flop circuit 48 having its K input grounded. The $\overline{Q}$ output of flip-flop circuit 48 is connected to still another separate input of address coincidence gate 22. Flip-flop 48 is reset by output signals from zero bits coincidence gate 46.

The apparatus of FIG. 1 is intended to receive digital words transmitted in groups of three, so that it may perform a redundancy check on the word. The circuit is connected so as to require receipt of the same word at least two times out of three before it can react thereto. Thus it will ignore all words having addresses different from its own, and all words having addresses which are not exactly identical in two out of the three times they are received, leaving intact the function that had been previously established by the last correctly-received trip of words.

When the first word of a trio of words has been clocked into shift register 17, and assuming that it is of the waveform illustrated for the code signal of FIG. 5, and also assuming that it is correctly addressed to the station at which the apparatus of FIG. 1 is located, the functions stages 29a and 29b of shift register 17 energize one of AND gates 23, 24, 25 and 26, depending on the function code transmitted. Assuming, for illustrative purposes, that the function code is 0,1 as shown in FIG. 5, AND gate 25 energizes the J input of flip-flop 32 and one input of AND gate 37. However, since flip-flops 30, 31, 32 and 33 are all in the reset condition prior to receipt of the first word of the trio (as will subsequently become evident), the Q output terminal of flip-flop 32 is deenergized and hence AND gate 37 supplies no output signal to the K input of flip-flop 40.

While the first word of the trio is still entirely within shift register 17, address coincidence gate 22 is energized from each of the address stages of shift register 17, as well as from flag stage 29c. Although at this time the J input of zero bits memory flip-flop 48 is energized, the $\overline{Q}$ output of the flip-flop remains energized (due to the flip-flop being in its reset condition) until occurrence of the next pulse from clock pulse generator 10 which initiates both transfer of the word out of the shift register and deenergization of the $\overline{Q}$ output of flip-flop 48. At this time (which is just prior to the word being shifted such that the flag bit is cleared out of the register), address coincidence gate 22 supplies a clock pulse to flip-flops 30, 31, 32 and 33, causing energization of the Q output of flip-flop 32 only. AND gate 37 consequently energizes the K input of flip-flop 40; however, the pulse produced by address coincidence gate 22 has terminated by this time, so that the Q output of flip-flop 40 undergoes no change in its energization state.

After the word in shift register 17 has been clocked entirely out of the register, the same word is again transmitted thereto, such that the second complete word is clocked into shift register 17 with waveform identical to that of the preceding word therein. Again the flag bit in the shift register acts to deenergize the $\overline{Q}$ output terminal of flip-flop 48 (which was energized due to detection of the zero bits or initial portion of the code signal of FIG. 5 in the address portion of shift register 17 by coincidence gate 46), and again AND gate 25 acts to energize one input to AND gate 37. Moreover, the output pulse produced by address coincidence gate 22 also serves to clock flip-flop 40 which, at this time, is undergoing excitation at its K input terminal as a result of the output signal from AND gate 37. Consequently the condition of flip-flop 40 becomes such that its Q output terminal is deenergized regardless of what its previous energization state may have been. Thus driver 42 is deenergized, and the function specified in the received word is performed on relay 44 and hence any fixtures controlled thereby.

In the foregoing description of operation, it was assumed that two consecutive words were correctly received, this being sufficient to obtain performance of the desired function. In event, however, that an erroneous address had been received the second time, for example, no output pulse would then be produced by address coincidence gate 22 and hence no transfer of data from flip-flop 32 to flip-flop 40 could have been accomplished upon receipt of the second consecutive word. However, flip-flop 32 does not change state after receipt of the second word so that if the third word received were correct, flip-flop 40 would thereupon receive energization at its K input and the desired function would be performed. Similarly, if an erroneous address had been received as part of the first word of the trio, no output pulse would then be produced by address coincidence gate 22 and hence no transfer of data into flip-flop 32 could occur. However, upon receipt of the correct second consecutive word, gate 22 facilitates this transfer and, upon receipt of the correct third consecutive word, gate 22 facilitates transfer of data from flip-flop 32 to flip-flop 40 so as to perform the desired function.

Assume that the first word was correctly received and that, upon receipt of the second word, the address was correct but the function data incorrectly called for a 1,1 function. Thus upon receipt of the complete second word, AND gate 26 energizes the J input of flip-flop 33 and one input of AND gate 38. However, because flip-flop 33 is in the reset condition prior to receipt of the second word of the trio (not having been changed rom this condition since a time prior to receipt of the first word of the trio), the Q output of flip-flop 33 remains deenergized so that AND gate 38 supplies no output signal to the J input of flip-flop 40. While the second word of the trio is still entirely within shift register 17, address coincidence gate 22 is energized from each of the address stages of shift register 17, as well as from the flag stage. The $\overline{Q}$ output of flip-flop 48 nevertheless remains energized (due to the flip-flop being in its reset condition) until occurrence of the next pulse from clock pulse generator 10 which, in the presence of the J input signal to flip-flop 48, initiates deenergization of the $\overline{Q}$ output of the flip-flop. At this time (which is just prior to the flag bit being cleared out of the shift register), address coincidence gate 22 supplies a clock pulse to flip-flops 30, 31, 32 and 33, causing energization of the Q output of flip-flop 33 while the Q output of flip-flop 32 remains energized and the Q outputs of flip-flops 30 and 31 remain deenergized. AND gate 38 consequently energizes the J input of flip-flop 40; however, the pulse produced by address coincidence gate 22 has terminated by this time, so that the Q output of flip-flop 40 undergoes no change in its energization state. If the third word received includes the correct address and function 0,1, AND gate 38 will not be energized and only AND gate 37 will serve to energize flip-flop 40 such that only the correct function will be performed. In this fashion, a large measure of protection against operation resulting from spurious signals is achieved.

Each time a correct address is entered into shift register 17, address coincidence gate 22 resets three-clock delay counter 47 to zero. Thus, when the first word with a correct address is entered in shift register 17, address coincidence gate 22 resets three-clock delay circuit 47 to zero. This produces a steady output signal from the three-clock delay circuit which, as will become apparent in conjunction with the description of FIG. 3, continues until the zero bits portions of three consecutive words with incorrect addresses have been clocked through shift register 17. By furnishing this signal to the reset inputs of flip-flops 30, 31, 32 and 33, the flip-flops are able to store function data received from AND gates 23, 24, 25 and 26, respectively, in the presence of this signal.

As evident from FIG. 5, the initial portion of the second received word consists of zero bits. An output pulse is supplied to three-clock delay circuit 47, providing it with a count of one, when these zero bits are detected by zero bit coincidence gate 46. This condition does not affect the output signal produced by three-clock delay circuit 47, so that flip-flops 30, 31, 32 and 33, having a reset signal still furnished thereto, are operable. Additionally, flip-flop 48 is switched by coincidence gate 46 to its reset condition, thereby energizing its input to address coincidence gate 22. If the address of the second consecutively-received word is correct, gate 22 is rendered operable because the zero bits portion of the second consecutive word has been detected in the address stages of the shift register, indicating that the previous address has been cleared out of the shift register and that the next address is about to enter the shift register. The second complete word is then clocked into shift register 17.

Assuming that the address of the second received word is erroneous (or intended for another remote location and hence bearing a different, albeit correct, address), or that no flag bit enters the shift register, (which indicates presence of an error in the word portion preceding the address), the address coincidence gate supplies no reset pulse to three-clock delay circuit 47. Consequently, when the second word is transferred out of shift register 17, the count in three-clock delay circuit 47 remains one. When the zero bits portion of the next consecutively-received word enters the address portion of shift register 17, coincidence gate 46 advances the count in three-clock delay circuit 47 to two. If the address of this third consecutively-received word is erroneous, or if the word lacks a flag bit, address coincidence gate 22 again cannot reset counter 47. Thus when the third word is transferred out of the shift register, the count in three-clock delay circuit 47 remains two. When the zero bits portion of the next consecutively-received word enters the address portion of shift register 17, coincidence gate 46 advances the count in three-clock delay circuit 47 to three. At this time, the output signal produced by three-clock delay circuit 47 is terminated, thereby causing each of flip-flops 30, 31, 32 and 33 to switch to its reset condition. As a result, any function data stored in these flip-flops are erased. Flip-flops 30, 31, 32 and 33 thus remain in their reset condition, awaiting receipt of the initial word of the next word trio to be correctly addressed to the remote station so as to permit resetting of three-clock delay circuit 47 and to allow intermediate data storage means 49 again to store functions data.

Figure 2:
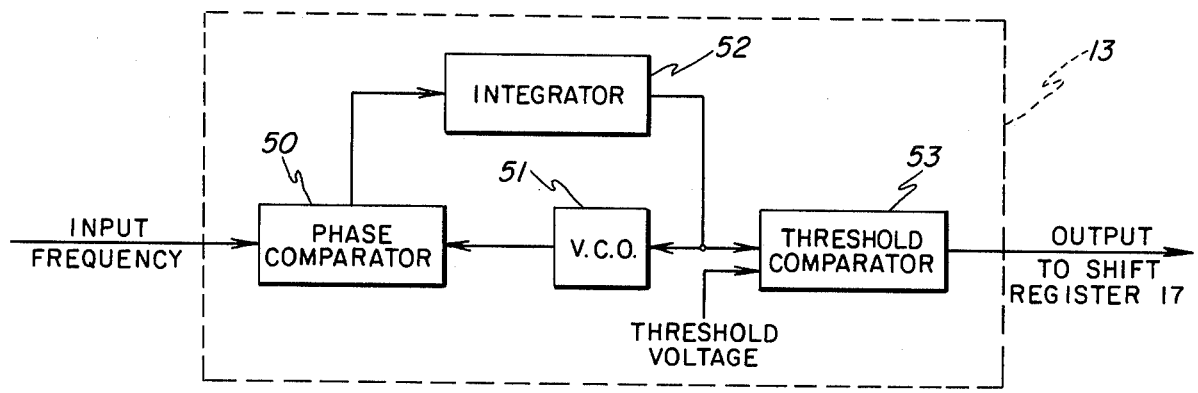
FIG. 2 is a block diagram of the phase-locked loop circuit employed in the apparatus of FIG. 1.

FIG. 2 is a block diagram illustration of phase-locked loop 13 of FIG. 1. The frequency-shifted input frequency (conveniently centered about 50 KHz) is supplied to one input of a phase comparator 50, the second input of which is energized by a voltage controlled oscillator 51. The integrated output voltage amplitude of phase comparator 50 is furnished by an integrator 52 to the input of voltage controlled oscillator 51 so as to control the voltage controlled oscillator output frequency in accordance with the integrator output voltage amplitude. The nominal output frequency of the voltage controlled oscillator is selected to be equal to the center frequency of the frequency-shifted information signal (typically 50 KHz). In addition, the output voltage of integrator 52 is compared to a predetermined threshold voltage in a threshold comparator 53, which supplies to shift register 17 an output ONE when the integrator output voltage exceeds the threshold level and an output ZERO when the integrator output voltage is below the threshold level.

In operation, assume a ZERO is received in the form of a 49 KHz signal by the apparatus of FIG. 1 and supplied to the input of the phase-locked loop of FIG. 2. Comparator 50 produces an output voltage of amplitude proportional to the phase difference detected between the received frequency and that of voltage controlled oscillator 51. The time-integrated output voltage of comparator 50 adjusts the frequency of voltage controlled oscillator 51 so as to match the oscillator to both the phase and frequency of the received signal. The integrated phase error voltage is also furnished to threshold comparator 53 as a signal of amplitude below that of the threshold voltage, causing the comparator to supply a ZERO to the shift register. On the other hand, if a ONE is received in the form of a 51 KHz signal, the integrated phase error voltage furnished to threshold comparator 53 constitutes a signal of amplitude above that of the threshold voltage, causing the comparator to supply a ONE to the shift register.

Figure 3:
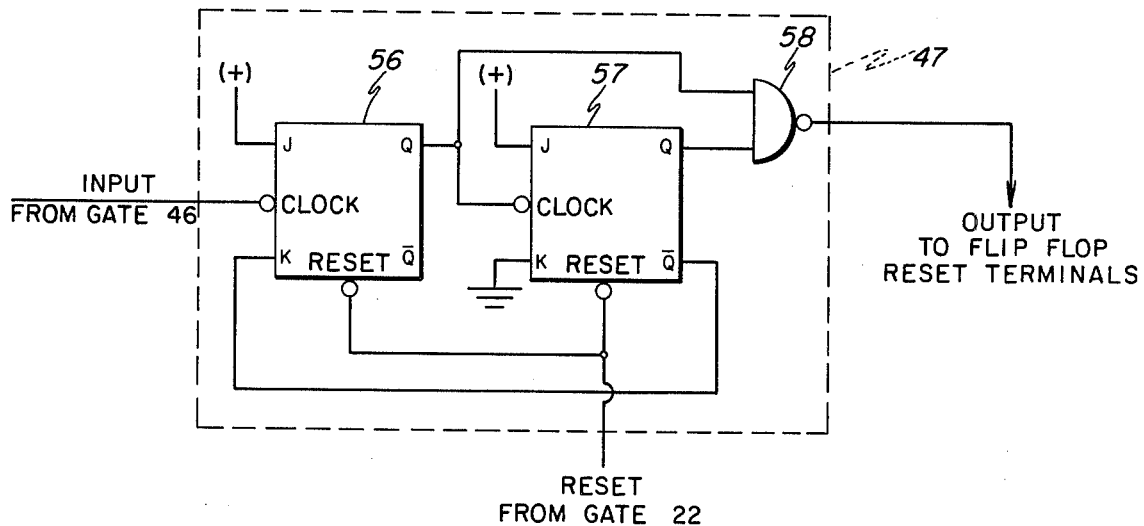
FIG. 3 is a block diagram of the three-clock delay circuit employed in the apparatus of FIG. 1.

FIG. 3 is a block diagram of three-clock delay circuit 47 employed in the apparatus of FIG. 1. This circuit comprises a pair of JK flip-flops 56 and 57, each having its J terminal positively biased. Input clock signals from zero bits coincidence gate 46 are furnished to the clock terminal of flip-flop 56, while the K input of flip-flop 56, which constitutes an enable input, is energized with an enable input signal from the complementary or $\overline{Q}$ output of flip-flop 57; that is, in the presence of an enable signal at its K input, each clock pulse acts to change the condition of flip-flop 56. The Q output of flip-flop 56 is connected to the clock input of flip-flop 57 and also to one input of a two-input NAND gate 58, the second input of which is connected to the Q output of flip-flop 57. The K input of flip-flop 57 is grounded, and the reset input of each of flip-flops 56 and 57 is connected to the output of coincidence gate 22. The output of NAND circuit 58 is connected to the reset inputs of each of flip-flops 30, 31, 32 and 33.

Operation of three-clock delay circuit 47 may be readily understood by referring to FIG. 3 in conjunction with the following Truth Table.

| | Three-Clock Delay Circuit Truth Table | | | |
|---|---|---|---|---|
| Word Addresses | Input Pulses | Flip-Flop 56 Q | Flip-Flop 57 Q | Nand Output |
| Correct | Reset | 0 | 0 | 1 | 1 |
| Incorrect | Clock 1 | 1 | 0 | 1 | 1 |
| Incorrect | Clock 2 | 0 | 1 | 0 | 1 |
| Incorrect | Clock 3 | 1 | 1 | 0 | 0 |
| Incorrect | Clock 4 | 1 | 1 | 0 | 0 |
| Incorrect | Clock n | 1 | 1 | 0 | 0 |
| Correct | Reset | 0 | 0 | 1 | 1 |

Thus, when a correct address is received in shift register 17 of FIG. 1, the Q output of flip-flop 56 is momentarily energized upon receipt of a clock input pulse from zero bits coincidence gate 22 since both its J and K inputs are energized, but immediately thereafter both flip-flops 56 and 57 are reset by the output signal from address coincidence gate 22 so that their Q outputs are both in the zero condition. Consequently, NAND gate 58 supplies an output signal corresponding to a ONE, thereby rendering each of flip-flops 30, 31, 32 and 33 of FIG. 1 responsive to signals that may be furnished simultaneously to its respective J and clock inputs.

When the next word with a correct address is received by shift register 17, address coincidence gate 22 will again furnish a reset signal to the circuit of FIG. 3, retaining the Q output of both flip-flops 56 and 57 deenergized. This condition is repeated until the address of a received word (i.e. "clock 1") is incorrect. The initial zero bits portion of this incorrect word will actuate zero bits coincidence gate 46 to supply a clock pulse to flip-flop 56, as occurs when a correct word is received. However, since the address portion in this instance is incorrect, flip-flop 56 will not immediately thereafter be reset by an output pulse from gate 22. The Q output of flip-flop 56 is thereby steadily energized, producing a ONE. However, flip-flop 57, at its clock input, responds only to negative-going voltages and since the voltage produced by output terminal Q of flip-flop 56 is positive-going, flip-flop 57 does not change state at this time. If the next received word (i.e. "clock 2") is also incorrect, the initial zero bits portion of this second consecutive incorrect word will again actuate zero bits coincidence gate 46 to supply a second clock pulse to flip-flop 56 which will not immediately thereafter be reset by an output pulse from address coincidence gate 22. Since both the J and K inputs of flip-flop 56 are energized at this time, the Q output of flip-flop 56 switches to a ZERO condition and the negative-going voltage transition thus produced on the Q output terminal of flip-flop 56 actuates flip-flop 57 to change its state. Accordingly, the Q output terminal of flip-flop 57 produces a ONE and the $\overline{Q}$ output terminal thereof produces a ZERO, deenergizing the K input of flip-flop 56. If the next received word (i.e. "clock 3") is also incorrect, the initial zero bits portion of this third consecutive incorrect word will again actuate zero bits coincidence gate 46 to supply a third clock pulse to flip-flop 56 which will not immediately thereafter be reset by an output pulse from address coincidence gate 22. Once again, therefore, the Q output terminal of flip-flop 56 is switched to the ONE state, with the positive voltage thereon being ineffectual to change the state of flip-flop 57. At this time, both inputs to NAND gate 57 are energized, so that the signal furnished to the reset inputs of flip-flops 30, 31, 32 and 33 is terminated. This causes each of flip-flops 30, 31, 32 and 33 to switch to the reset condition, clearing out any information which may have been stored therein.

Subsequent output pulses (i.e. "clock 4" through "clock n") from zero bits coincidence gate 46, without any intervening correct address being transferred into shift register 17, fail to restore any output signal from NAND gate 58, since flip-flop 56 remains locked in the condition whereby the Q output terminal is energized. This condition occurs because the $\overline{Q}$ output of flip-flop 57 remains in a ZERO condition, retaining application of zero voltage to the K input of flip-flop 56. Under these circumstances, every input clock pulse supplied to flip-flop 56 simply leaves the flip-flop in an unchanged condition. These circumstances change, however, when the next correct address is received in shift register 17, since address coincidence gate 22 thereupon supplies a reset pulse to both flip-flops 56 and 57, causing the Q output terminal on each of flip-flops 56 and 57 to return to its ZERO or deenergized condition. This restores the output voltage on NAND gate 58, thereby rendering each of flip-flops 30, 31, 32 and 33 capable of being switched into the condition in which the respective Q output terminal thereof is energized.

Figure 4:
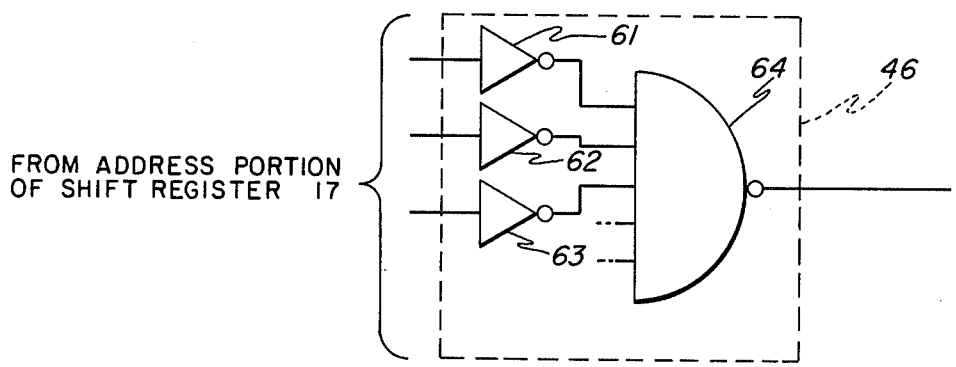
FIG. 4 is a block diagram of the zero bits coincidence gate circuit employed in the apparatus of FIG. 1.

FIG. 4 is a block diagram of zero bits coincidence gate 46, illustrating the means by which ZERO bits in shift register 17 are detected. Each of the stages in the address portion of shift register 17 is connected to the input of a respective inverter, only three of which, 61, 62, and 63 are shown. The output of each inverter is connected to a separate input of an n-input AND gate 64. In this fashion, each ZERO detected in a separate stage of shift register 17 supplies a ONE to the input of AND gate 64. Whenever all the shift register stages connected to zero bits coincidence gate 46 are in the ZERO condition, an output signal is produced by gate 46.

The foregoing describes a method and apparatus for decoding redundant address and function codes and providing control signals in accordance with the function codes. The remotely-located apparatus for receiving information from a central location exhibits a high degree of immunity to false signals. The system receives signals through a carrier current transmitted over power circuits and performs functions only at times when there is strong likelihood that the received signal is the signal intended to have been received. The apparatus readily lends itself to implementation in integrated circuit form.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

We claim:

1. Carrier current actuated control apparatus comprising:
    shift register means for temporary storage of a repeatedly-received digital word containing address and function data, said shift register including an address portion and a functions portion;
    intermediate data storage means coupled to the functions portion of said shift register means for transferring the function data to said intermediate data storage means;
    switching means coupled to said intermediate data storage means for performing desired operations, and
    address detection means responsive to the address portion of said shift register means for actuating said intermediate data storage means to transfer function signals to said switching means.

2. The apparatus of claim 1 including counting means responsive to said shift register means for counting the number of consecutively-received digital words bearing an address different from a predetermind address assigned to said apparatus, said counting means clearing said intermediate data storage means after a predetermined number of words with invalid addresses for said apparatus have been consecutively received.

3. The apparatus of claim 2 including coincidence detection means coupling said counting means to the address portion of said shift register means for advancing the count in said counting means each time the address portion of said shift register means is in a clear condition.

4. The apparatus of claim 3 including means coupling said counting means to said address detection means for resetting said counting means each time the address portion of said shift register means receives a digital word bearing the predetermind address assigned to said apparatus.

5. The apparatus of claim 1 including means coupling said shift register means to said address detection means to limit capability of said address detection means for transferring data into and out of said intermediate data storage means only to those times when a ONE bit is present in the final stage of said shift register means.

6. The apparatus of claim 5 including coincidence detection means coupled to the address portion of said shift register means, and additional switching means responsive to said coincidence detection means and coupled to said address detection means to limit said address detection means to capability for transferring data into and out of said intermediate data storage means only at those times when the address portion of said shift register means has been in a clear condition after the immediately-preceding received digital word has been transferred out of said shift register means.

7. The apparatus of claim 6 including counting means responsive to said shift register means for counting the number of consecutively-received digital words bearing an address different from a predetermined address assigned to said apparatus, said counting means clearing said intermediate data storage means after a predetermined number of words with invalid addresses for said apparatus have been consecutively received, and means coupling said counting means to the address portion of said shift register means for advancing the count in said counting means each time the address portion of said shift register means is in a clear condition.

8. The apparatus of claim 7 including means coupling said counting means to said address detection means for resetting said counting means each time the address portion of said shift register means receives a digital word bearing the predetermined address assigned to said apparatus.

9. A resettable counter for producing a steady indication after three consecutive counts without an intervening reset signal, comprising:
first and second flip-flop means, said second flip-flop means producing complementary output signals from an output and a complementary output;
means coupling a count pulse to a clock input of said flip-flop means, said count pulse changing state of said flip-flop means alternately in presence of an enable input signal supplied thereto;
means coupling the output of said first flip-flop means to a clock input of said second flip-flop means, said clock input of said second flip-flop means being responsive only to changes of voltage amplitude occurring in only one polarity direction;
means coupling the complementary output of said second flip-flop means to an enable input of said first flip-flop means;
NAND circuit means for providing an output signal from said resettable counter; and
means coupling the output of each of said first and second flip-flop means to a separate input, respectively, of said NAND circuit means.

10. The resettable counter of claim 9 including means providing a reset signal to each of said flip-flop means in order to reset said counter to zero.

11. A method of rendering controlled apparatus relatively immune to spurious control signals comprising:
monitoring received digital signals to detect simultaneous presence of a predetermined address in a received digital word along with a flag bit occurring at the leading end of said received digital word;
temporarily transferring function data received in said digital word into storage when said predetermined address and said flag bit occur simultaneously; and
operating said controlled apparatus in accordance with said function data when identical digital words have appeared a predetermined number of times out of a larger number of consecutively-received digital words.

12. The method of claim 11 including the step of clearing said function data from storage when identical digital words have not appeared at least said predetermined number of times out of said larger numer of consecutively-received digital words.

13. A method of rendering controlled apparatus relatively immune to spurious control signals comprising:
monitoring received digital signals to detect simultaneous presence of a predetermined address in a received digital word along with a flag bit occurring at the leading end of said received digital word;
temporarily transferring function data received in said digital word into storage when said predetermined address and said flag bit occur simultaneously; and
operating said controlled apparatus in accordance with said function data when identical digital words have appeared twice out of three consecutively-received digital words.

14. The method of claim 13 including the step of clearing said function data from storage when identical digital words have not appeared at least twice out of said three consecutively-received digital words.

* * * * *